W. W. JOHNSON.
GAME APPARATUS.
APPLICATION FILED DEC. 17, 1913.
1,126,024.
Patented Jan. 26, 1915.
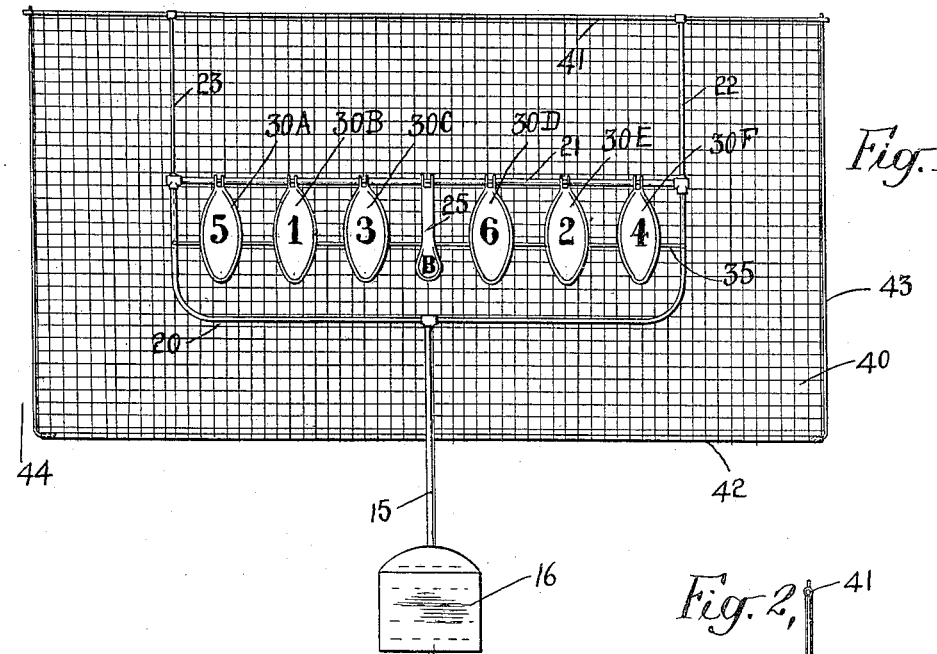
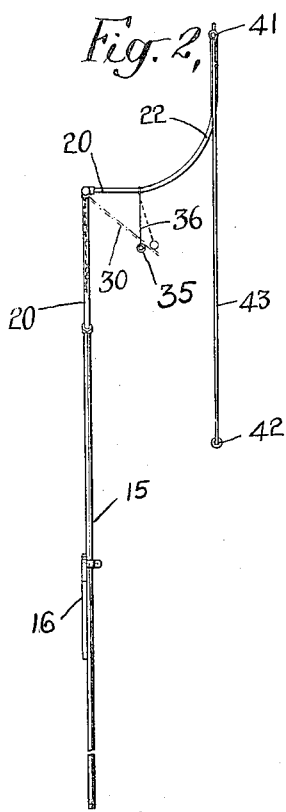
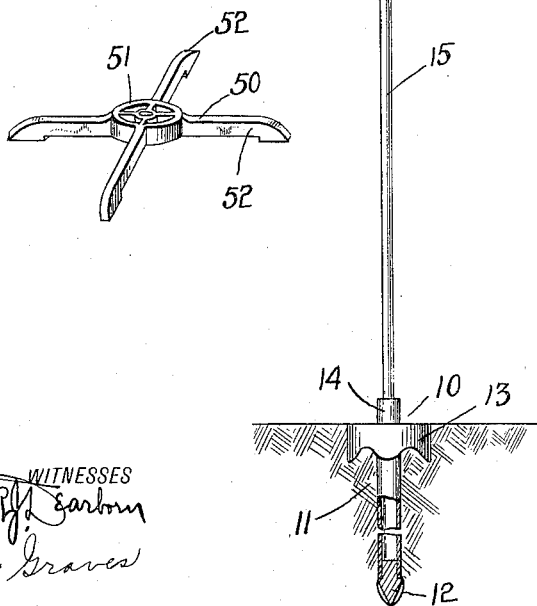
WITNESSES
INVENTOR
William W. Johnson
BY
E. W. Marshall
ATTORNEY

UNITED STATES PATENT OFFICE.

WILLIAM W. JOHNSON, OF YONKERS, NEW YORK.

GAME APPARATUS.

1,126,024.  Specification of Letters Patent.  Patented Jan. 26, 1915.

Application filed December 17, 1913. Serial No. 807,173.

*To all whom it may concern:*

Be it known that I, WILLIAM W. JOHNSON, a citizen of the United States of America, and a resident of Yonkers, Westchester county, and State of New York, have invented certain new and useful Improvements in Game Apparatus, of which the following is a specification, reference being had to the accompanying drawing, forming a part thereof.

My invention relates to game apparatus and particularly to such as comprises a target at which a ball is thrown by a player.

One object of my invention is to provide apparatus of this character that shall be simple and particularly permanent and rugged in construction.

Another object is to provide a single sounding member which is readily influenced by any one of a series of targets.

Another object is to provide a net suspension whereby the back net may be held taut under varying atmospheric and service conditions.

Other objects and advantages of my invention will be set forth hereinafter, and in order that my invention may be fully understood, I will now proceed to describe it in the following specification and then point out the novel features thereof in appended claims.

Referring to the drawings: Figure 1 is a front elevation of a game apparatus arranged and constructed in accordance with my invention, the base or socket being broken away and shown in section to illustrate the details of its construction. Fig. 2 is a side view of the upper part of the apparatus shown in Fig. 1.

A modified base or socket structure which is adapted particularly for indoor use, is shown in Fig. 3. While the specific structure illustrated is believed to be particularly desirable and well adapted for the purpose for which it is intended, it is only illustrative of the invention and does not limit it in scope.

With special reference to Figs. 1 and 2, the structure here shown comprises a base or socket 10, a pole or rod 15, a frame 20, a central narrow target 25, and a plurality of wider targets $30^A$—$30^B$, etc., a resonant rod or sounder 35, and a back net 40. More specifically the base or socket 10 has a tubular body 11, closed at its lower end by a plug 12, and with its upper end 14 threaded or otherwise adapted to receive the pole or rod 15. A flanged head or enlargement 13 which is flat and is intended to be flush with the surface of the ground, is provided to steady the device. Since the plug 12 is conical in form it may be readily driven into the ground. The head 13 is also preferably prepared to be forced into the ground in some suitable manner, as for example by making it in the form of a hollow drum and scalloping the lower edge of its flange. Secured to the upper end of the pole or rod 15, which may be made in two sections as shown in the drawing, is the frame 20, which is preferably U-shaped and supports a transverse suspension rod 21 upon which the targets 25 and 30 are pivotally mounted. A pair of curved arms 22—23 extend backwardly and upwardly from the ends of the suspension rod 21 and form supports for a top rod 41 of the net 40. The sounding member 35, which is preferably in the form of a metal tube, is suspended by cords or wires 36 which are attached to it near its respective ends and are fastened to arms 22—23. The positions of the several targets may be fixed longitudinally of the suspension rod 21 by any suitable means such as, for example, a plurality of spacing sleeves which fit freely onto the suspension rod. As shown in the drawing I preferably employ ordinary pipe fittings between the pole 15, the frame 20, and the net rod 41. Secured to the pole 15 at a convenient height for inspection, is a bulletin board 16 upon which the rules of the game and the directions for playing it may be posted. The net rod 41 is threaded through the net at the top and a rod or bar 42 is threaded through the net at the bottom. A pair of end rods 43—44 are threaded through or woven into the net at its ends. At their lower ends these rods are secured to the bar 42, and at their upper ends they are connected with the respective ends of the rod 41. The targets may be marked in some suitable manner to distinguish the target 25 from the others and the targets 30 marked with numerals to enable the player to count up a score. I prefer to make the targets of cast metal and cast the numerals or other designating marks on their faces.

A player is provided with one or more balls of suitable size and kind, the size not to exceed and preferably less than the space between targets. From a predetermined distance the player throws the balls in succession at the targets. If any of the targets is struck it will swing back against the resonant tube or sounder which will ring with a sound much like that of an ordinary gong.

The manner in which the game is played forms no part of my present invention and it may be widely varied, in fact the apparatus is capable of being used in playing different games. My invention does however, pertain to the apparatus, but inasmuch as the apparatus may be modified within the spirit and scope of my invention I intend that only such limitations be imposed as are indicated in appended claims.

While the apparatus is well adapted for use in the open air it may readily be arranged for use indoors and its size will be determined by the conditions under which it may be employed. A base such as the base 50 shown in Fig. 3 having a central spider 51 and a plurality of arms 52 may be substituted for the base 10 when the game is played indoors or when the apparatus is set up on a hard floor.

As an example of a modification of my invention the frame may be supported by suitable brackets from a side wall or ceiling instead of being supported by a vertical pole or rod.

What I claim is:

1. A game apparatus comprising a rod, a plurality of spaced targets pivoted thereon, a single sounding member behind the targets and adapted to be actuated by any of the targets swinging backwardly on its pivot.

2. A game apparatus comprising a rod, a plurality of spaced targets pivoted thereon, a single sounding member behind the targets and adapted to be actuated by any of the targets swinging backwardly on its pivot, and a back stop suspended behind the sounding member.

3. A game apparatus comprising a stationary base or socket, a pole or rod extending upwardly therefrom, a frame at the top of the pole or rod comprising a horizontal transverse rod, a plurality of spaced targets pivotally suspended therefrom, and a single means for producing a signal when any one of the targets swings backwardly on its pivot.

4. A game apparatus comprising a stationary base or socket, a pole or rod extending upwardly therefrom, a frame at the top of the pole or rod comprising a horizontal transverse rod, a plurality of spaced targets pivotally suspended therefrom, and a single sounding member behind the targets adapted to be actuated by any of the targets swinging backwardly on its pivot.

5. A game apparatus comprising a stationary base or socket, a pole or rod extending upwardly therefrom, a frame at the top of the pole or rod comprising a horizontal transverse rod, a plurality of spaced targets pivotally suspended therefrom, and a metal tube suspended in parallelism with the suspension rod and behind the targets whereby a signal is produced when any one of the targets is swung backwardly on its pivot.

6. A game apparatus comprising a stationary base or socket, a pole or rod extending upwardly therefrom, a frame at the top of the pole or rod comprising a horizontal transverse rod, a plurality of spaced targets pivotally suspended therefrom, arms extending backwardly and upwardly from the top of the frame, a sounding bar suspended from the arms, a net frame, and a back net secured to said frame.

7. A game apparatus comprising a plurality of spaced targets, a single sounding member associated with the targets and adapted to be actuated by the movement of any one of the targets when said target is hit in play.

8. A game apparatus comprising a row of spaced targets, a horizontally disposed sounding bar behind said targets, said targets being arranged to actuate the sounding bar by their movement when said targets are hit in play.

9. A game apparatus comprising a plurality of swinging targets and a single signal means adapted to be actuated by any of the targets when it is hit in play.

10. A game apparatus comprising a stationary base or socket, a pole or rod extending upwardly therefrom, a frame at the top of the pole or rod comprising a horizontal transverse rod, a relatively narrow central target, and a plurality of wide targets on the respective sides of the central target and a sounding member, each of said targets being pivotally mounted on the horizontal transverse rod and adapted to actuate the sounding member.

11. A game apparatus comprising a stationary base or socket, a pole or rod extending upwardly therefrom, a frame at the top of the pole or rod comprising a horizontal transverse rod, a relatively narrow central target and a plurality of wide targets on the respective sides of the central target pivotally suspended from said rod, curved arms extending backwardly and upwardly from the top of the frame, a sounding bar suspended from the curved arms, a net frame suspended from said frame, and a back net secured to said frame.

In witness whereof I have hereunto set my hand in the presence of two subscribing witnesses, this 16 day of December, 1913.

WILLIAM W. JOHNSON.

Witnesses:
F. GRAVES,
R. J. DEARBORN.

Copies of this patent may be obtained for five cents each, by addressing the "Commissioner of Patents, Washington, D. C."